(12) United States Patent
Pollard et al.

(10) Patent No.: US 10,883,775 B2
(45) Date of Patent: Jan. 5, 2021

(54) COMPONENT WITH HEAT EXCHANGER

(71) Applicant: HS Marston Aerospace Limited, Wolverhampton (GB)

(72) Inventors: Berwyn Pollard, Wolverhampton (GB); Paul Phillips, Bromsgrove (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 133 days.

(21) Appl. No.: 15/941,021

(22) Filed: Mar. 30, 2018

(65) Prior Publication Data

US 2018/0283804 A1    Oct. 4, 2018

(30) Foreign Application Priority Data

Mar. 31, 2017 (EP) .................................... 17164344

(51) Int. Cl.
*F28F 9/00* (2006.01)
*F16H 57/04* (2010.01)
*B64D 35/00* (2006.01)

(52) U.S. Cl.
CPC ......... *F28F 9/001* (2013.01); *F16H 57/0417* (2013.01); *B64D 35/00* (2013.01); *F28F 2230/00* (2013.01); *F28F 2280/02* (2013.01)

(58) Field of Classification Search
CPC ...... F16H 57/0417; F16H 41/30; F16H 57/04; F16H 2700/00; F01P 11/08; F01P 2060/04; F28F 9/001; F28F 2280/02
USPC ....... 74/606 A; 184/104.1, 104.3; 123/41.33; 60/605.3, 456, 912
See application file for complete search history.

(56) References Cited

U.S. PATENT DOCUMENTS

| 2,796,239 A | * | 6/1957 | Holmes | F28D 9/0037 165/164 |
| 3,876,401 A | * | 4/1975 | Sturgill | B01D 46/00 55/481 |
| 4,260,013 A | | 4/1981 | Sumitomo | |

(Continued)

FOREIGN PATENT DOCUMENTS

| EP | 1643162 A2 | 4/2006 |
| EP | 3067587 A1 | 9/2016 |

(Continued)

OTHER PUBLICATIONS

Extended European Search Report for EP Application No. 17164344.8 dated Sep. 8, 2017, 8 pages.

*Primary Examiner* — Jianying C Atkisson
*Assistant Examiner* — Jose O Class-Quinones
(74) *Attorney, Agent, or Firm* — Cantor Colburn LLP

(57) ABSTRACT

A component that generates or requires heat includes a heat exchanger integrated with the component. The component includes a component housing holding functional parts of the component, and the heat exchanger has a heat exchanger housing formed integrally with the component housing. There is a first fluid circuit in which a first fluid flows through the component in a heat exchange relationship with the functional parts, into the heat exchanger via a first fluid inlet, through the heat exchanger, out of the heat exchanger via a first fluid outlet, and back to the functional parts of the component. The heat exchanger has a second fluid inlet and a second fluid outlet for connection into a second fluid circuit in which a second fluid flows from outside of the component into the component.

14 Claims, 2 Drawing Sheets

(56) References Cited

U.S. PATENT DOCUMENTS

| | | | | |
|---|---|---|---|---|
| 5,165,468 | A * | 11/1992 | Tajima | B60K 11/04 |
| | | | | 165/167 |
| 6,415,760 | B2 * | 7/2002 | Mack | F01M 5/021 |
| | | | | 123/196 R |
| 7,172,157 | B2 | 2/2007 | Jones | |
| 7,278,472 | B2 | 10/2007 | Meshenky et al. | |
| 9,016,356 | B2 * | 4/2015 | Hollweck | F01M 5/002 |
| | | | | 165/157 |
| 9,163,716 | B2 * | 10/2015 | Chudy | F16H 57/0483 |
| 2005/0217830 | A1 | 10/2005 | Matsubara et al. | |
| 2008/0053060 | A1 * | 3/2008 | Olver | F02C 7/14 |
| | | | | 60/226.1 |
| 2010/0025486 | A1 * | 2/2010 | Sanger | F24V 40/00 |
| | | | | 237/1 R |
| 2011/0024082 | A1 | 2/2011 | Bharne et al. | |
| 2013/0180496 | A1 * | 7/2013 | Murphy | F28D 9/005 |
| | | | | 123/196 A |
| 2014/0360698 | A1 | 12/2014 | Waldman et al. | |
| 2015/0129181 | A1 | 5/2015 | John et al. | |
| 2017/0051821 | A1 * | 2/2017 | Long | F16H 57/0412 |

FOREIGN PATENT DOCUMENTS

| | | |
|---|---|---|
| JP | 2001253257 A | 9/2001 |
| JP | 2010031981 A | 2/2010 |
| WO | 2013106240 A1 | 7/2013 |

* cited by examiner

COMPONENT WITH HEAT EXCHANGER

FOREIGN PRIORITY

This application claims priority to European Patent Application No. 17164344.8 filed on Mar. 31, 2017, the entire contents of which is incorporated herein by reference.

TECHNICAL FIELD

The invention relates to a component that generates or requires heat. The invention also relates to a method of manufacture of the component.

BACKGROUND

Various types of components generate or require heat. There is thus a need for heat to be transferred into or out of the component. Typically this is done by pairing the component with a suitable heat exchanger, and connecting the two with appropriate fluid flow paths. Heat exchangers are used in a variety of fields for exchange of heat between two or more fluids, with the fluids passing through two or more fluid circuits. Various types of heat exchangers are known, and the common features for heat exchangers generally include an inlet and an outlet for each fluid flow path, a heat exchanger core where the bulk of the heat transfer takes place and some flow paths for directing the flow of fluid from each inlet through the core, and from the core to the each outlet.

There is a need for components to have heat exchangers in various fields, for example for heating or cooling of components in fields such as aerospace engineering, automotive engineering, and so on. It is typical for heat exchangers to be selected or designed with a specific heat load and/or heat source in mind. For high performance and/or mass produced components the heat exchanger may be designed in a bespoke fashion to meet a specification set by the component manufacturer, or by a company that is also setting a separate specification relating to the component itself. An example is a helicopter transmission that requires cooling. An aerospace company would set a specification for the helicopter transmission. The specification might include restrictions on a cooling requirement or might set other performance criteria that result in a design with a certain calculated cooling requirement. The aerospace company would hence also set a specification for a heat exchanger that would satisfy the cooling requirement. It is typical for a specialised heat exchanger engineer to design a heat exchanger to meet such a cooling (or heating) requirement, and to also take account of other factors affecting the design, such as the fluids to be handled by the heat exchanger, the working temperatures and pressures, and so on.

SUMMARY

Viewed from a first aspect, the invention provides a component that generates or requires heat, the component including: a component housing holding functional parts of the component that generate or require heat; a heat exchanger having a heat exchanger housing formed integrally with the component housing; and a first fluid circuit in which a first fluid flows through the component in a heat exchange relationship with the functional parts, into the heat exchanger via a first fluid inlet, through the heat exchanger, out of the heat exchanger via a first fluid outlet, and back to the functional parts of the component; wherein the heat exchanger has a second fluid inlet and a second fluid outlet for connection into a second fluid circuit in which a second fluid flows from outside of the component into the component housing and into the heat exchanger via the second fluid inlet, out of the heat exchanger via the second fluid outlet and out of the component housing; and wherein the heat exchanger housing contains a removable heat exchanger core for exchange of heat between the first fluid in the first fluid circuit and the second fluid in the second fluid circuit, with the heat exchanger core being separate to the heat exchanger housing and removable from the heat exchanger housing. The heat exchanger core may be removable during maintenance operations, for example. Thus, the heat exchanger housing can be configured to contain the heat exchanger core.

In a conventional situation the component and the heat exchanger would be designed and manufactured completely separately and only coupled together to form the required fluid circuits when they were assembled into a final product. For example, considering the example of a helicopter transmission given above where the helicopter transmission would be the component of the first aspect, the conventional arrangement would have a helicopter transmission as a first part with connections for the first fluid circuit, and the heat exchanger would be a separate part with connections for the first and second fluid circuits. When the helicopter (or a section of the helicopter) was assembled then the transmission and the heat exchanger would be mounted in their respective places and plumbed together to complete the first fluid circuit. This is in clear contrast to the component proposed in the first aspect, where the heat exchanger housing is integrated with the component housing and where the first fluid circuit is formed along with the component and the heat exchanger. The first fluid circuit may advantageously include no external plumbing or connections and in fact the various fluid paths for the first fluid circuit, aside from at the removable core, may themselves be formed integrally with the housings of the heat exchanger and the component.

Moreover, the heat exchanger core is separate to the heat exchanger housing and can be removed during maintenance operations. Thus, the heat exchanger core may be manufactured separately to the housing and may have a different construction and/or be made of a different material to the housing. This gives further advantages since it means that the integration of the heat exchanger housing with the component housing does not result in any constraint on the material or the construction of the heat exchanger core, which can be designed as required to meet a specified heating or cooling load. In addition, it means that the integration of the heat exchanger housing with the component housing does not result in any penalty in terms of the maintenance of the heat exchanger and to allow for degradation of the heat exchanger core during use. Thus, during the life of the component and the life of the heat exchanger it is possible to easily remove the core in order to inspect the core and heat exchanger housing, to replace the core, to recondition the core, and/or for cleaning of the core as well as the housing and other parts associated with the core.

The removable core may be a cartridge type system allowing for "plug and play" interaction of the core with the heat exchanger. In some examples the removable core includes openings forming passageways for the first fluid and/or for the second fluid, and these openings are aligned with corresponding openings in the heat exchanger housing in order to connect the removable core into the first fluid circuit and/or the second fluid circuit. The removable core may be formed as a single piece and may hence be insertable and removable from the housing as a single piece. This is in contrast to layered heat exchanger core structures that maybe removed from their housing in separate pieces such as by removing single layers or sets of layers. The insertion and removal of the core may involve a simple physical movement of the core into and out of the heat exchanger housing, for example insertion via a sliding movement and/or a twisting movement. In some examples the core is removed by a sliding motion and thus is essentially a "lift out" core. The heat exchanger may include a cover and/or a locking mechanism for holding the core in place in the housing and for preventing unwanted removal of core from the housing. For example, the heat exchanger may include a cover attached or attachable to the heat exchanger housing for retaining the core and/or for enclosing the core in the housing. The cover may be joined to the housing by one or more of a hinge mechanism, bolts, a screw thread, a latch and/or a clip. The cover may optionally include a part of the second fluid circuit, as discussed below. The heat exchanger housing, the core and the cover may be arranged such that once the cover is opened then the core can be removed from the heat exchanger housing.

The heat exchanger core may be constructed based on any suitable heat exchanger principle, and preferably is a single piece as noted above. Thus, the heat exchanger core may be a brazed plate fin core, a laminate core, or an additive manufactured core. The heat exchanger core includes a part of the first fluid circuit and a part of the second fluid circuit arranged in heat exchange relationship so that heat may be transferred between first fluid and second fluid. Thus, the heat exchanger core may include multiple fluid paths for the first fluid as well as multiple fluid paths for the second fluid, wherein the fluid paths for first fluid and the fluid paths for the second fluid are thermally connected, for example via intervening walls of a thermally conductive material, in order to transfer heat between the two fluids. It should be noted that although the discussion herein is focused on a first fluid and a second fluid in some situations there may be more than two fluids involved and consequently the heat exchanger as well as the heat exchanger core could include an additional fluid path and correspondingly an additional inlet and outlet for one or more further fluids.

The heat exchanger housing is integrated with the component housing and thus may be fully within the component housing and/or formed as a single part along with the component housing. The heat exchanger housing and the component housing may be formed during a single manufacturing process. The heat exchanger housing and the component housing may be formed of the same material, and optionally during a single manufacturing process as noted above. For example, the heat exchanger housing and the component housing may be formed together during manufacturing by casting, machining, and/or additive manufacturing. The heat exchanger housing may be integrated with the component housing in that once manufactured a single homogenous body of material forms at least part of both housings and optionally the entirety of one or both housings. Thus, the heat exchanger housing may be characterised as a subsection of the component housing. By integrating the heat exchanger housing with the component housing it becomes possible to increase the efficiency of the design of both the component and the heat exchanger since the available space may be utilised with less waste and the two parts formed together can be packaged more tightly and made using less material than a prior art situation in which there is a component and a separate heat exchanger. In some examples the heat exchanger housing forms a structural part of the component housing and thus carries structural loads related to the component. Such structural loads may relate to the support of the component and/or may arise due to forces generated during use of the component for its intended purpose.

As noted above, the removable core may include openings forming passageways for the first fluid and/or for the second fluid, and these openings can be aligned with corresponding openings in the heat exchanger housing when the core is in the heat exchanger housing in order to connect the removable core into the first fluid circuit and/or the second fluid circuit. Thus, the inlet and outlet for first fluid and/or the inlet and outlet for the second fluid may be fluidly connected to openings in the heat exchanger housing for flow of fluid via the openings through the core in order for the required heat exchange to occur.

The heat exchanger may include one or more valves for control of the flow of the first fluid and/or the second fluid. For example, the first fluid circuit may have a valve arrangement for controlling flow of fluid through the first fluid inlet and the first fluid outlet. The heat exchanger housing may incorporate a valve housing to hold such a valve arrangement.

In some examples at least one of the inlets, for example the first fluid inlet, includes an inlet manifold for distribution of fluid to a first set of multiple openings at an inner wall of the heat exchanger housing with the core including corresponding inlet openings at its outer surface for receiving fluid from the first set of openings at the inner wall of the heat exchanger housing. A corresponding outlet, for example the first fluid outlet, may similarly include an outlet manifold for receiving fluid from a second set of multiple openings at the inner wall of the heat exchanger housing with the core including corresponding outlet openings at its outer surface for passing fluid to the second set of openings at the inner wall of the heat exchanger housing. The first set of openings and the second set of openings may be at opposite sides or at opposite ends of the heat exchanger housing such that the fluid traverses the length or width of the core as it passes between the inlet and the outlet. Alternatively, the fluid may flow through the core via a serpentine path such as an S or U type path, with one or more divisions within the core to guide the flow of fluid. In the latter case, for a U-shaped path, the first set of openings and the second set of openings may be at the same side or the same end of the heat exchanger housing.

Both of the first fluid and the second fluid may pass into and out of the core via multiple openings as discussed above. Alternatively, one of the first fluid and the second fluid may pass into and out of the core via such multiple openings and the other of the first fluid and the second fluid may have a different arrangement. In one example one of the fluids has an inlet and outlet having manifolds as discussed above, with the fluid entering the core via openings in the sides of the inner wall of the heat exchanger housing, whereas the other of the fluids enters and leaves the core with a different arrangement, for example via an inlet and outlet opposite ends of the core, or via an inlet and outlet both at one end of the core and a U-shaped path through the heat exchanger with a suitable division along the core. In the latter case the U-shaped path may be entirely within the core so that the core is also formed with the turning section of the path, or alternatively the turning section may be formed within the heat exchanger housing at the opposite end to the inlet and outlet, with the core simply having separated flow paths from end to end for flow in two opposite directions from the inlet and to the outlet. With such arrangements one of the fluids passes through the heat exchanger housing generally side to side, in a transverse direction, and the other of the fluids passes through the heat exchanger generally end to end, in a longitudinal direction. An example embodiment uses manifolds and a transverse flow for first fluid with a longitudinal flow for the second fluid. The flow of fluid through the core may be contained and channelled by flow paths defined by elements of the core, for example plates and fins, laminate layers and so on, as mentioned above Where a fluid enters and/or leaves the heat exchanger core through an end of the heat exchanger housing then one or both of the inlet and the outlet may be in a cover of the heat exchanger as described above. In one example the cover may form a connector for the second fluid circuit and may include one or both of the second fluid inlet and the second fluid outlet.

The fluid paths for the first fluid circuit may be all internal to the component, for example they may be all internal to the component housing. In some cases it is advantageous for some or all of the fluid paths to be formed integrally with the heat exchanger housing and the component housing. For example, the first fluid inlet and the first fluid outlet, including associated manifolds where present, may be formed integrally with the heat exchanger housing. Optionally, the first fluid inlet and the first fluid outlet may be connected to fluid paths formed integrally with the component (for example integrally with the component housing) that connecting the first fluid inlet and the first fluid outlet to fluid paths in heat exchange relationship with the functional parts. Thus, the plumbing for the first fluid circuit may be entirely within the component and advantageously some or all parts of the plumbing may be formed integrally with the component, and in particular may be formed integrally with the component housing. By forming the plumbing for the first fluid circuit as well as the housing of the heat exchanger within and/or integrally with the component housing then further advantages are realised in relation to the utilisation of space and the plumbing as well as the component and the heat exchanger can be packaged more tightly.

The location of the heat exchanger integral to the component also permits shorter flow paths within the first fluid circuit. This reduces the amount of fluid needed and may also reduce unwanted transfer of heat in areas outside of the component. In some examples the functional parts of the component generate heat during normal use and the first fluid is hence the hot fluid in the heat exchanger, with the second fluid being used to remove heat from the heat exchanger. In this case the heat from the component is contained within the component whilst being removed from it via the heat exchanger. It may be that the only external plumbing required is for the second fluid, i.e. the cold fluid in this example, which would have a lower maximum temperature than the first fluid. The highest temperatures in the system are thus contained within the component and within the heat exchanger integrated with the component.

The second fluid circuit includes parts external to the component and external to the heat exchanger. The second fluid circuit can include a heat sink or heat source for transfer of heat with the second fluid at some external point, in which case the second fluid circuit may be a closed circuit. Alternatively, the second fluid circuit can be open to a source of fluid at ambient temperature, such as atmospheric air. Thus, the heat exchanger can be a part of a system that uses ambient air for cooling (or heating), such as a buffer cooler in an aircraft. The second fluid inlet may receive air from atmosphere, for example via a compressor or via a ram system, and the second fluid outlet may return air to atmosphere after heat exchange with the first fluid in the core. It will be noted that the use of a removable core has further advantages where the second fluid is atmospheric air, since atmospheric air can introduce contaminants into the heat exchanger that may lead to a requirement for more regular maintenance of the core.

The heat exchanger may include seals for ensuring that the first and/or the second fluid is contained within the respective fluid circuit. Thus, there may be one or more seal(s) for preventing or restricting flow of fluid out of the heat exchanger housing and/or between the first fluid circuit and the second fluid circuit. In one example, which uses openings between the inner wall of the heat exchanger housing and the outer surface of the core, there is a seal arrangement preventing or restricting flow of fluid between the inlet openings and the outlet openings in order to ensure that the fluid passes through the heat exchanger core. Where the heat exchanger has a cover as described above there may be a seal between the cover and the heat exchanger housing in order to prevent or restrict flow of fluid out of the heat exchanger. It will be appreciated that depending on the fluids involved then there may be different considerations in relation to the seals. For example, where the heat exchanger uses a coolant to remove heat from oil then it could be important to fully contain both the coolant and the oil in their respective circuits. However, where ambient air is used as the second fluid then a certain amount of leakage can be tolerated in relation to the second fluid circuit.

The component has functional parts that result in the generation of heat or in a requirement for heat. Heat may be generated as a waste product of operation of the functional parts, such as through heat generated by friction in a mechanical component. A component may require heat when it operates in low temperature conditions and efficiency is increased if the operating temperature of the functional parts can be increased. For example, fuel or oil heating may increase the efficiency of an engine or other mechanical component. The component and its functional parts have their own function that is separate to the operation of the heat exchanger, that is to say the functional parts are provided in addition to the heat exchanger and the heat exchanger is not one of the functional parts in context of the first aspect and the optional features described herein. In general, the main function of the component is provided by the functional parts, and the main function of the component is typically not heat exchange, with the purpose of the heat exchanger being to aid operation of the component. The component may for example include mechanical or hydraulic parts as the functional parts, such a mechanical or hydraulic transmission system or gearbox, and the heat exchanger may be for removing heat generated by friction at the mechanical or hydraulic parts.

In some examples the component is an aerospace component, for example an aircraft transmission system. The heat exchanger integrated with the component may be an aerospace buffer cooler or it may be a part of another aerospace cooling or heating system. In other examples the component is an automotive component, such as a transmission system for a car or other vehicle, in particular a high performance transmission system.

The heat exchanger may be for aiding the performance of the component and also for recovering heat from the component, with this heat being used in other parts of a system in which the component is used. For example, heat recovered from an aircraft transmission system such as a helicopter gearbox may be used for heating other aspects of the aircraft, such as fuel heating and/or heating the aircraft cabin.

In a second aspect, the invention provides a method comprising: use of the component of the first aspect; and removing the removable core during a maintenance operation. The maintenance operation may include one or more of: inspecting the core, inspecting the heat exchanger housing, replacing the core, reconditioning the core, cleaning the core, and/or cleaning the heat exchanger housing. The component, including the heat exchanger, may have any of the features discussed above.

In a further aspect, the invention provides a method of manufacturing a component with a heat exchanger, wherein the component is as described above in the first aspect, and wherein the method comprises: forming the component housing and the heat exchanger housing together with the heat exchanger housing integrated into the component housing; forming a void in the heat exchanger housing for receiving the removable core; and inserting the removable core into the void to thereby connect the removable core with the first fluid circuit and the second fluid circuit.

In the manufacturing method the component, including the heat exchanger, may be provided with any of the features discussed above in relation to the first aspect. The manufacturing of the component housing and the heat exchanger housing may involve casting, machining and/or additive manufacturing. For example, the housings may first be cast or additive manufactured and then machined as a finishing step. The method may further include manufacturing the removable core, for example as a brazed plate fin core, a laminate core or an additive manufactured core. The core may be manufactured from different materials and/or using a different manufacturing technique to the manufacture of the heat exchanger housing.

BRIEF DESCRIPTION OF THE DRAWINGS

A preferred embodiment of the invention will now be described by way of example only and with reference to the accompanying drawings in which.

DETAILED DESCRIPTION

Figure 2:
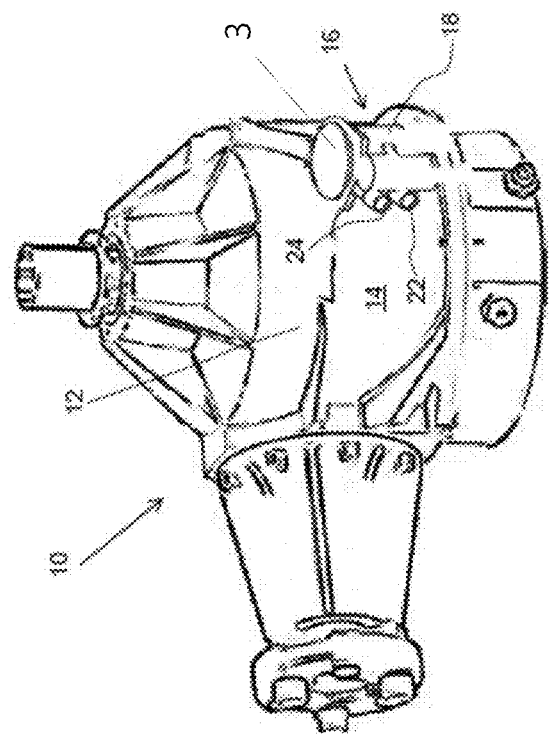
FIG. 2 is a schematic illustration of the heat exchanger integrated into a component housing.
Figure 1:
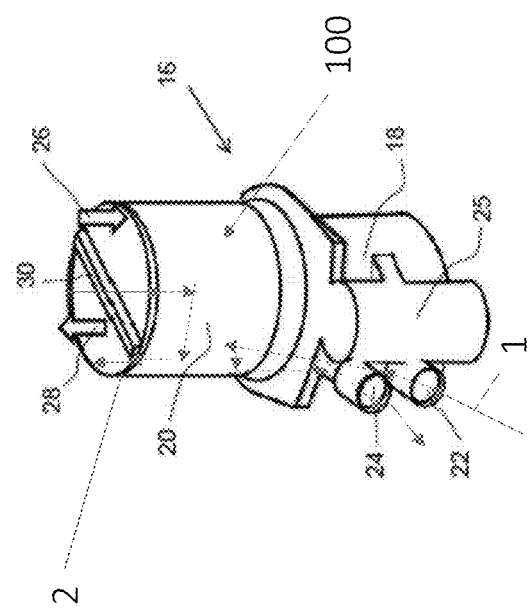
FIG. 1 shows a heat exchanger housing with a removable core.
Figure 3:
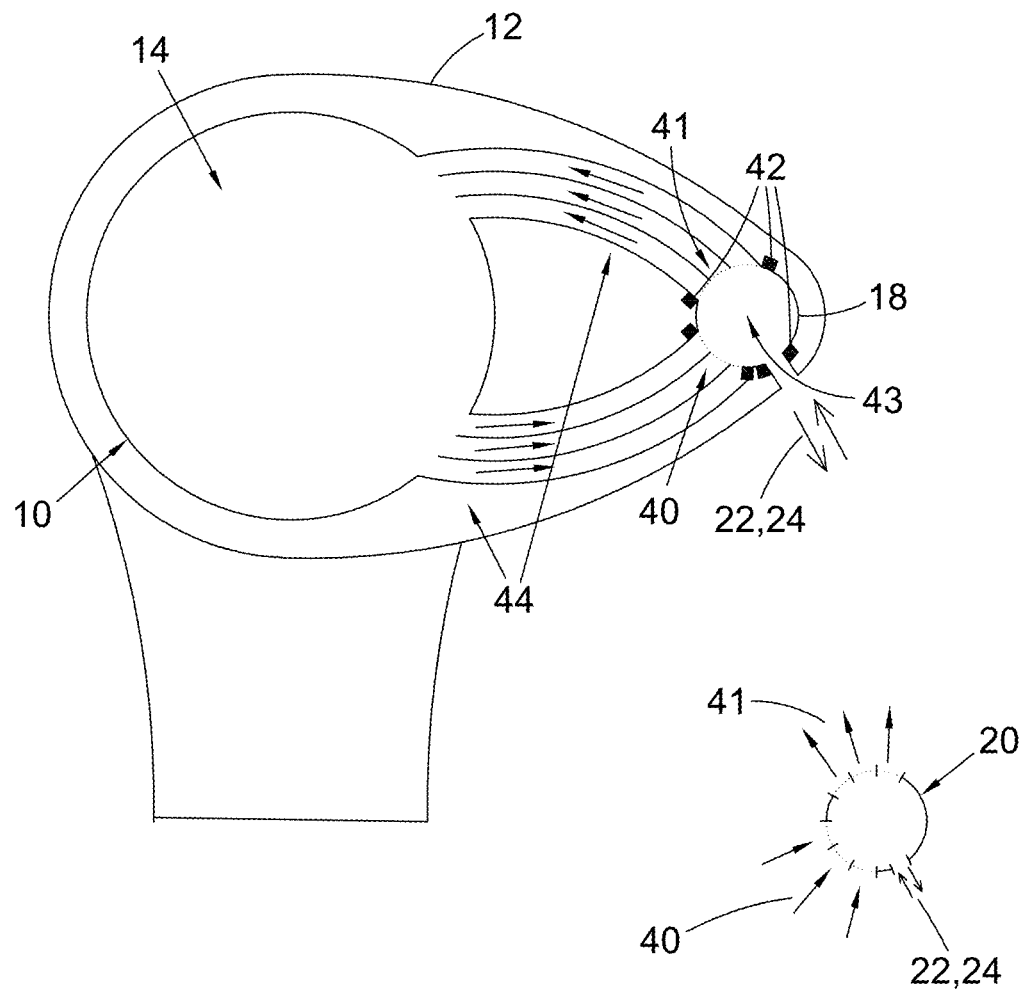
FIG. 3 shows a cross-sectional view of the heat exchanger housing formed integrally with the component housing.

As is well known, various components generate heat or require heat. Often a component will generate heat as a waste product and in this example the component 10 is a source of heat with a heat exchanger 16 being used to remove heat from the component 10. It will however be appreciated that the proposed integrated heat exchanger 16 could be used for heating rather than cooling of the component 10.

As shown in the Figures the component 10 includes a housing 12 holding functional parts 14 of the component that generate heat. The component 10 may for example be a transmission system such as a gearbox with heat being generated via friction in functional parts 14 in the form of the gears of the gearbox. A heat exchanger 16 is integrated into the component 10. The heat exchanger 16 has a heat exchanger housing 18 formed integrally with the component housing 12, for example by manufacture of both housings 12, 18 in the same process such as via casting or additive manufacturing. The heat exchanger housing 18 is structurally coupled with the component housing 12 and carries forces from loads applied to the component housing 12 as well as forces from loads applied to the heat exchanger housing itself. The integration of the housings 12, 18 allows for more efficient use of space as well as advantages through use of the heat exchanger housing 18 to strengthen the component housing 12, and vice versa.

The heat exchanger 16 includes a removable core 20, which is shown outside of the heat exchanger housing 18 in the figures so that more details can be seen. The core 20 slots into a void 43 within the housing 18 of the heat exchanger.

The heat exchanger 16 is connected to a first fluid circuit (arrows 1) in which a first fluid flows through the component 10 in a heat exchange relationship with the functional parts 14, into the heat exchanger 16 via a first fluid inlet 22, through the heat exchanger core 20, out of the heat exchanger 16 via a first fluid outlet 24, and back to the functional parts 14 of the component 10. This first fluid circuit is hence contained entirely within the component 10 and it can have all the required flow paths fully within the component housing 12 and optionally integrated with the housing 12. In the example of a transmission system the first fluid would be a lubricant or other fluid requiring cooling to remove heat from friction in the transmission system and thus the first fluid would be the hot fluid in the heat exchanger 16. Flow of the first fluid through the first fluid inlet 22 and first fluid outlet 24 is controlled using valves in a valve housing 25, which is integrated with the heat exchanger housing 18 and can be manufactured together with the heat exchanger housing 18 and the component housing 12 in a single manufacturing process as discussed above. The figures show the first fluid inlets 22 and the first fluid outlet 24 emerging from the heat exchanger housing 18, which would typically be within the component housing 12, although it will be appreciated that the first fluid inlet and outlet 22, 24 could advantageously be fully integrated with the component housing 12 and hence may be fully encased within the material that forms the component housing 12 and heat exchanger housing 18.

The heat exchanger 16 is also connected to a second fluid circuit (arrows 2) which partly flows through the heat exchanger 16 and the component 10 and also flows externally, for example to an external heat sink or heat source or in fluid paths connected to a source of ambient fluid such as atmospheric air. The heat exchanger 16 thus also has a second fluid inlet 26 and a second fluid outlet 28 for connection into a second fluid circuit in which a second fluid flows from outside of the component 10 into the component housing 12 and into the heat exchanger 16 via the second fluid inlet 26, through the heat exchanger core 20, then out of the heat exchanger 16 via the second fluid outlet 28 and out of the component housing 12. The figures show the core 20 removed from the heat exchanger housing 18 and thus not all details of the second fluid inlet 26 and the second fluid outlet 28 are shown. In a typical arrangement flow conduits for the second fluid inlet 26 and the second fluid outlet 28 can be formed as part of a cover arrangement 3 to be applied over the top of the removable core 20 once it has been inserted into the heat exchanger housing 18.

With the second fluid inlet 26 and the second fluid outlet 28 at the upper end of the heat exchanger housing the second fluid flows into and out of the core 20 at the same end and passes through the heat exchanger in a U-shaped path. The core 20 hence includes a divider 30 splitting the second fluid flow through the core into a downward flow path from the second fluid inlet 26 and an upward flow path returning to the second fluid outlet 28, with "downward" and "upward" referring to the orientation shown in the figures. The flow paths extend longitudinally through the core 20 from a first end of the core 20, where both the inlet 26 and the outlet 28 are located, and toward the opposite end of the core 20. The U-shaped flow path includes a turning section, which can be formed within the core 20 or alternatively could be formed at the end of the core 20 opposite the inlet 26 and outlet 28 and within the heat exchanger housing 18 instead of within the core 20.

The first fluid flows through the core 20 from the first fluid inlet 22 and back to the first fluid outlet 24. The flow of the first fluid is distributed by a manifold arrangement 40, 41 that can be formed within the heat exchanger housing 18. The manifold arrangement 40, 41 sends the first fluid transversely across the core 20 in a heat exchange relationship with the longitudinal flow paths of the second fluid. It will of course be appreciated that the arrangement described for this example could be varied depending on the requirements of the heat exchanger 16 and the construction selected for the heat exchanger core 20. The locations of the inlets and outlets and the fluid connections associated with the two fluid circuits could vary.

Suitable seals 42 are used in order to contain the first fluid at the second fluid act to prevent or restrict leakage of fluid out of the system or between the two fluid circuits. For example, in the arrangement shown in the figures there may be O-ring seals at the two ends of the heat exchanger core 22 ensure that the first fluid is contained within the heat exchanger housing 18. There may additionally be a sealing arrangement at the upper end of the heat exchanger core 20 in order to contain the flow of second fluid as it enters and leaves the core 20.

The removable core 20 is made of a single unitary piece that incorporates all the required openings to connect with the first fluid circuit and the second fluid circuit. The removable core 20 may, for example, be a brazed plate fin heat exchange core, a laminated heat exchanger core or an additive manufactured heat exchanger core. It would typically be manufactured using different materials and/or a different manufacturing technique to the manufacture of the heat exchanger housing 18 and the component housing 12. The shape of the core 20 can be varied depending on the shape of the heat exchanger housing 18, which itself can vary in accordance with the available space and the requirements of the design of the component housing 12 into which the heat exchanger housing 18 is integrated. The example in the figures uses a cylindrical core 20, but any shape could be used in accordance with the requirements of the particular component 10 and heat exchanger 16.

In other variations compared to the example shown in the figures, as well as changes to the shape and configuration of the heat exchanger housing 18 and the removable core 20 there could be heat exchange with additional fluids, i.e. a third fluid circuit included in system along with the first and second fluid circuits; there may be variations in the locations and configurations of the different inlets and outlets: and the materials used as well as the manufacturing method for the core 20, the heat exchanger housing 18 and the component housing 12 can vary depending on the particular considerations for a specific component 10.

In an example method of manufacture for the component 10 the component housing 12 can be formed in a suitable fashion, perhaps as is conventional for that particular type of component. Thus, in the example of a transmission system then the transmission system housing might be formed by casting, machining or additive manufacturing. The heat exchanger housing 18 is formed along with the component housing 12 and as a part of the same manufacturing process such that the heat exchanger housing 18 is integrated with the component housing 12 as discussed above. The heat exchanger housing 18 includes a void 100 for receiving the removable core 20. After an initial casting or additive manufacturing process for the housings 12, 18 the inner wall of the heat exchanger housing 18 may be machined in order to ensure a close fit with the removable core 20 and to allow for suitable sealing arrangement to be used.

The removable core 20 can be manufactured using known techniques for heat exchanger cores, with the shape and configuration of the core 20 being set based on the shape and configuration of the heat exchanger housing 18 and the various inlets and outlets. The removable core 20 can be inserted into heat exchanger housing 18 in a "plug and play" type fashion. For example it may be simply dropped in vertically as shown in the figures. A cover (not shown) can then be fitted at the top of the heat exchanger housing 18 in order to contain the core 20 and to complete the connections for the second fluid. During later use of the component 10 and the heat exchanger 16 the core 20 can readily be removed during maintenance operations, for example for inspection, replacement, reconditioning, and/or cleaning.

The invention claimed is:

1. A component that generates or requires heat, the component including:
   a component housing holding functional parts of the component that generate or require heat, wherein the functional paths are fully within the component housing;
   a heat exchanger having a heat exchanger housing formed integrally with the component housing; and
   a first fluid circuit in which a first fluid flows through the component in a heat exchange relationship with the functional parts, into the heat exchanger housing via a first fluid inlet of the heat exchanger housing, through the heat exchanger, out of the heat exchanger housing via a first fluid outlet of the heat exchanger housing, and back to the functional parts of the component;
   wherein the heat exchanger housing has a second fluid inlet and a second fluid outlet for connection into a second fluid circuit in which a second fluid flows from outside of the component into the component housing and into the heat exchanger housing via the second fluid inlet, out of the heat exchanger housing via the second fluid outlet and out of the component housing; and
   wherein the heat exchanger housing contains a removable heat exchanger core for exchange of heat between the first fluid in the first fluid circuit and the second fluid in the second fluid circuit, with the heat exchanger core being separate to the heat exchanger housing and removable from the heat exchanger housing during maintenance operations.

2. A component as claimed in claim 1, wherein the removable core is formed as a single piece and is insertable and removable from the heat exchanger housing as a single piece.

3. A component as claimed in claim 1, wherein the heat exchanger includes a cover attached or attachable to the heat exchanger housing for retaining the core and for enclosing the core in the heat exchanger housing.

4. A component as claimed in claim 1, comprising a housing part, wherein the heat exchanger housing is formed as a first subsections of the housing part along with the component housing as a second subsection of the housing part and the housing has been formed during a single manufacturing process.

5. A component as claimed in claim 1, wherein the heat exchanger housing forms a structural part of the component housing.

6. A component as claimed in claim 1, wherein the removable core includes inlet openings and outlet openings forming passageways for the first fluid and/or for the second fluid, and when the core is in the heat exchanger housing these openings are aligned with corresponding openings in the heat exchanger housing in order to connect the removable core into the first fluid circuit and/or the second fluid circuit.

7. A component as claimed in claim 6, comprising a seal element preventing or restricting flow of the first fluid and/or the second fluid between the inlet openings and the outlet openings.

8. A component as claimed in claim 1, wherein the heat exchanger includes seal elements for ensuring that the first fluid and/or the second fluid is contained within the respective fluid circuit.

9. A component as claimed in claim 1, wherein the first fluid inlet includes an inlet manifold for distribution of the first fluid to a first set of multiple openings at an inner wall of the heat exchanger housing with the core including corresponding inlet openings at its outer surface for receiving the first fluid from the first set of openings at the inner wall of the heat exchanger housing; and wherein the first fluid outlet includes an outlet manifold for receiving the first fluid from a second set of multiple openings at the inner wall of the heat exchanger housing with the core including corresponding outlet openings at its outer surface for passing the first fluid to the second set of openings at the inner wall of the heat exchanger housing; such that the first fluid passes transversely across the core.

10. A component as claimed in claim 1, wherein the second fluid inlet and the second fluid outlet are at opposite ends of the core, or the second fluid inlet and the second fluid outlet are both at one end of the core and are joined by a U-shaped path through the heat exchanger with a suitable division along the core; such that the second fluid passes longitudinally along the core.

11. A component as claimed in claim 1, wherein the functional parts of the component generate heat during use and the first fluid is hence the hot fluid in the heat exchanger, with the second fluid being used to remove heat from the heat exchanger.

12. A component as claimed in claim 1, wherein the component includes mechanical or hydraulic parts as the functional parts and the heat exchanger is for removing heat generated by friction at the mechanical or hydraulic parts.

13. A method comprising: use of the component as claimed in claim 1; and removing the removable core during a maintenance operation.

14. A method of manufacturing a component as claimed in claim 1, wherein the method comprises: forming the component housing and the heat exchanger housing together with the heat exchanger housing integrated into the component housing; forming a void in the heat exchanger housing for receiving the removable core; and inserting the removable core into the void to thereby connect the removable core with the first fluid circuit and the second fluid circuit.

\* \* \* \* \*